(12) United States Patent
Lee

(10) Patent No.: US 11,496,657 B2
(45) Date of Patent: Nov. 8, 2022

(54) CAMERA ASSEMBLY HAVING ROTATABLE REFLECTIVE MEMBER AND ELECTRONIC DEVICE COMPRISING SAME

(71) Applicant: Samsung Electronics Co., Ltd., Suwon-si (KR)

(72) Inventor: Seunghwan Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 49 days.

(21) Appl. No.: 17/044,832

(22) PCT Filed: Mar. 29, 2019

(86) PCT No.: PCT/KR2019/003693
§ 371 (c)(1),
(2) Date: Oct. 1, 2020

(87) PCT Pub. No.: WO2019/198956
PCT Pub. Date: Oct. 17, 2019

(65) Prior Publication Data
US 2021/0136261 A1 May 6, 2021

(30) Foreign Application Priority Data

Apr. 13, 2018 (KR) .................. 10-2018-0043277

(51) Int. Cl.
*H04N 5/225* (2006.01)
*G02B 7/08* (2021.01)
(Continued)

(52) U.S. Cl.
CPC ............. *H04N 5/2253* (2013.01); *G02B 7/08* (2013.01); *G02B 7/182* (2013.01); *G03B 5/00* (2013.01);
(Continued)

(58) Field of Classification Search
CPC .. H04N 5/2253; H04N 5/2252; H04N 5/2254; G02B 7/08; G02B 7/182; G03B 5/00
See application file for complete search history.

(56) References Cited

U.S. PATENT DOCUMENTS

| 8,224,169 B2 | 7/2012 | Tsuruta et al. |
| 8,238,736 B2 | 8/2012 | Tsuruta et al. |

(Continued)

FOREIGN PATENT DOCUMENTS

| KR | 10-1999-0031341 A | 12/1999 |
| KR | 10-2008-0101126 A | 11/2008 |

(Continued)

OTHER PUBLICATIONS

International Search Report and Written Opinion of the International Searching Authority in connection with International Application No. PCT/KR2019/003693 dated Jul. 18, 2019, 10 pages.

(Continued)

*Primary Examiner* — Christopher K Peterson

(57) ABSTRACT

A camera assembly is provided. The camera assembly comprises: a frame comprising a first side wall, a second side wall facing the first side wall, and a base formed between the first side wall and the second side wall; a linear driving portion comprising a first movable member coupled to the first side wall to be able to slide and a second movable member coupled to the second side wall to be able to slide; a lens module arranged on the base, the lens module comprising at least one lens and an image sensor; a reflective member comprising a first surface onto which external light is incident and a second surface formed at a predetermined angle with the first surface so as to face the lens; and a holder on which the reflective member is disposed, the holder comprising a support portion supported on the base so as to rotate around a first rotational axis perpendicular to the optical axis of the lens and around a second rotational axis perpendicular to the optical axis and to the first rotational axis. The first movable member is connected to one side of the reflective member, with reference to the support portion, and the second movable member is connected to the other side thereof. When the first movable member and the second movable member move in the same direction, the reflective member may rotate around the first rotational axis. When the first movable member and the second movable member move in different directions, the reflective member may rotate around the second rotational axis.

15 Claims, 15 Drawing Sheets

(51) Int. Cl.

| | | |
|---|---|---|
| *G02B 7/182* | (2021.01) | |
| *G03B 5/00* | (2021.01) | |
| *G03B 17/17* | (2021.01) | |
| *G02B 7/18* | (2021.01) | |
| *G03B 30/00* | (2021.01) | |
| *G03B 37/00* | (2021.01) | |
| *G03B 37/02* | (2021.01) | |
| *G02B 7/02* | (2021.01) | |

(52) U.S. Cl.
CPC ......... *H04N 5/2252* (2013.01); *H04N 5/2254* (2013.01); *G03B 2205/0053* (2013.01)

(56) References Cited

U.S. PATENT DOCUMENTS

| | | |
|---|---|---|
| 8,358,924 B2 | 1/2013 | Ollila et al. |
| 8,442,392 B2 | 5/2013 | Ollila et al. |
| 9,662,583 B2 | 5/2017 | Kawaguchi et al. |
| 10,126,633 B2 | 11/2018 | Avivi et al. |
| 10,372,022 B2 | 8/2019 | Avivi et al. |
| 2006/0067672 A1* | 3/2006 | Washisu ................. G03B 17/17 396/351 |
| 2011/0103782 A1 | 5/2011 | Tsuruta et al. |
| 2011/0150442 A1 | 6/2011 | Ollila et al. |
| 2011/0159957 A1 | 6/2011 | Kawaguchi et al. |
| 2013/0201571 A1* | 8/2013 | Theriault ............. G02B 7/1824 359/872 |
| 2013/0222664 A1* | 8/2013 | Takahashi ........... H04N 5/2254 348/333.01 |
| 2017/0242225 A1 | 8/2017 | Fiske |
| 2017/0336596 A1* | 11/2017 | Nishimoto ........... G02B 7/1821 |
| 2018/0035031 A1 | 2/2018 | Kwak et al. |
| 2018/0120674 A1 | 5/2018 | Avivi et al. |
| 2019/0049822 A1 | 2/2019 | Avivi et al. |

FOREIGN PATENT DOCUMENTS

| | | |
|---|---|---|
| KR | 10-2010-0084045 A | 7/2010 |
| KR | 10-2014-0058450 A | 5/2014 |
| KR | 10-2015-0104326 A | 9/2015 |
| KR | 10-2017-0126993 A | 11/2017 |
| KR | 10-2018-0012688 A | 2/2018 |

OTHER PUBLICATIONS

Request for the Submission of an Opinion dated May 26, 2022 in connection with Korean Patent Application No. 10-2018-0043277, 17 pages.

* cited by examiner

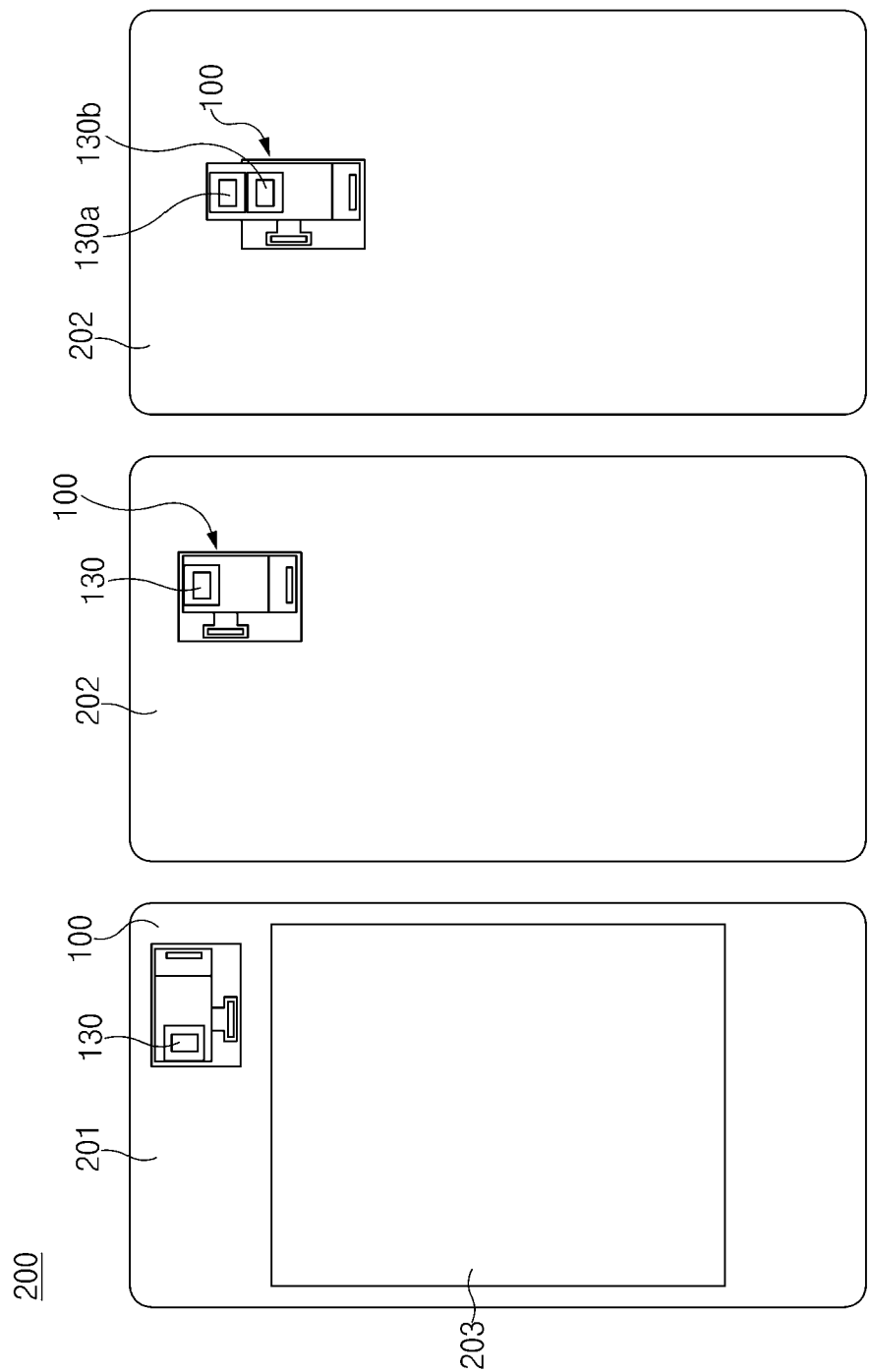

CAMERA ASSEMBLY HAVING ROTATABLE REFLECTIVE MEMBER AND ELECTRONIC DEVICE COMPRISING SAME

CROSS-REFERENCE TO RELATED APPLICATIONS

This application is a 371 National Stage of International Application No. PCT/KR2019/003693, filed Mar. 29, 2019, which claims priority to Korean Patent Application No. 10-2018-0043277, filed Apr. 13, 2018, the disclosures of which are herein incorporated by reference in their entirety.

BACKGROUND

1. Field

The disclosure relates to a camera assembly and an electronic device including the same.

2. Description of Related Art

Optical information of a subject is input to an image sensor of a camera of a portable electronic device through a lens and is converted into an electrical signal. At this time, the horizontal/vertical sizes of an image are determined by an angle of view that is an optical design specification.

To obtain information outside an angle of view, a user, after taking a first image, may rotate a mobile phone itself and may take a second image. When the user directly rotates the mobile phone and takes an image, an image in which the first image and the second image are matched may not be obtained due to temporal and spatial differences from the photo previously taken.

SUMMARY

An aspect of the disclosure is to provide a camera assembly capable of changing an angle of view. Furthermore, another aspect of the disclosure is to provide an electronic device that includes a rotating optical member including two rotational degrees of freedom, but minimizes an increase in thickness.

In various embodiments, a camera module includes a frame including a first sidewall, a second sidewall that faces the first sidewall, and a base formed between the first sidewall and the second sidewall, a linear actuator module including a first movable member slidably coupled to the first sidewall and a second movable member slidably coupled to the second sidewall, at least one lens disposed on the base, an image sensor disposed on one side in an optical axis direction of the at least one lens, a reflective member on which external light is incident and that includes a reflective surface that changes an optical path to direct the incident external light toward the at least one lens and the image sensor, the reflective member being disposed on an opposite side in the optical axis direction of the at least one lens, and a holder having the reflective member disposed therein, the holder including a support part supported on the base so as to be rotated to correspond to a rotational direction having a first axis of rotation perpendicular to an optical axis of the lens as a center of rotation, or a rotational direction having a second axis of rotation perpendicular to the optical axis and the first axis of rotation as a center of rotation. The first movable member and the second movable member are connected to one side and an opposite side of the holder with respect to the support part, and the reflective member is configured to rotate about the first axis of rotation and/or the second axis of rotation depending on movement directions and movement distances of the first movable member and the second movable member.

In various embodiments, a camera assembly includes an image sensor, one or more lenses disposed over the image sensor, a light reflecting member that reflects light incident from outside the camera assembly and delivers the light to the one or more lenses, a support ball that is physically connected with the light reflecting member and that has at least a partial protruding area formed to be a curved surface, a first support member including a first portion and a second portion disposed on opposite sides of the support ball, a second support member with which the support ball is brought into contact and that supports rotation of the first support member, a first actuator that moves in a first specified direction or a second specified direction and that is connected with the first portion, a second actuator that moves in the first specified direction or the second specified direction and that is connected with the second portion, and control circuitry that controls the first actuator and the second actuator. The control circuitry is configured to move the first actuator or the second actuator in the first specified direction or the second specified direction such that the light reflecting member is rotated about the support ball along the curved surface depending on a force that the first actuator applies to the first portion and/or a force that the second actuator applies to the second portion.

In various embodiments, an electronic device includes a housing including a front wall, a rear wall, and an opening formed in the front wall and/or the rear wall, and a camera module provided in the housing, at least part of the camera module being disposed under the opening. The camera module includes a reflective member that reflects external light incident through the opening toward the inside of the housing, an image sensor that converts the external light reflected by the reflective member into an electrical signal, an optical part including at least one lens disposed between the reflective member and the image sensor, a holder that is disposed in the housing and that includes a support ball that supports rotation of the reflective member to enable the reflective member to rotate, a first linear actuator and a second linear actuator that move in an optical axis direction of the lens between the front wall and the rear wall of the housing, and control circuitry. The reflective member includes a first portion supported by the support ball, a second portion formed on one side of the first portion and connected to the first linear actuator, and a third portion formed on an opposite side of the first portion and connected to the second linear actuator. The control circuitry controls the reflective member to rotate about a first axis of rotation perpendicular to the optical axis direction and/or a second axis of rotation perpendicular to the optical axis direction and the first axis of rotation depending on displacements of the first linear actuator and the second linear actuator in the optical axis direction.

The camera assembly according to the embodiments of the disclosure may rotate the optical axis of the lens in at least two degrees of freedom, thereby providing a wide angle of view.

In addition, the disclosure may provide various effects that are directly or indirectly recognized.

BRIEF DESCRIPTION OF THE DRAWINGS

FIG. 8 is a view illustrating an electronic device including the camera assembly according to an embodiment.

DETAILED DESCRIPTION

Figure 1:
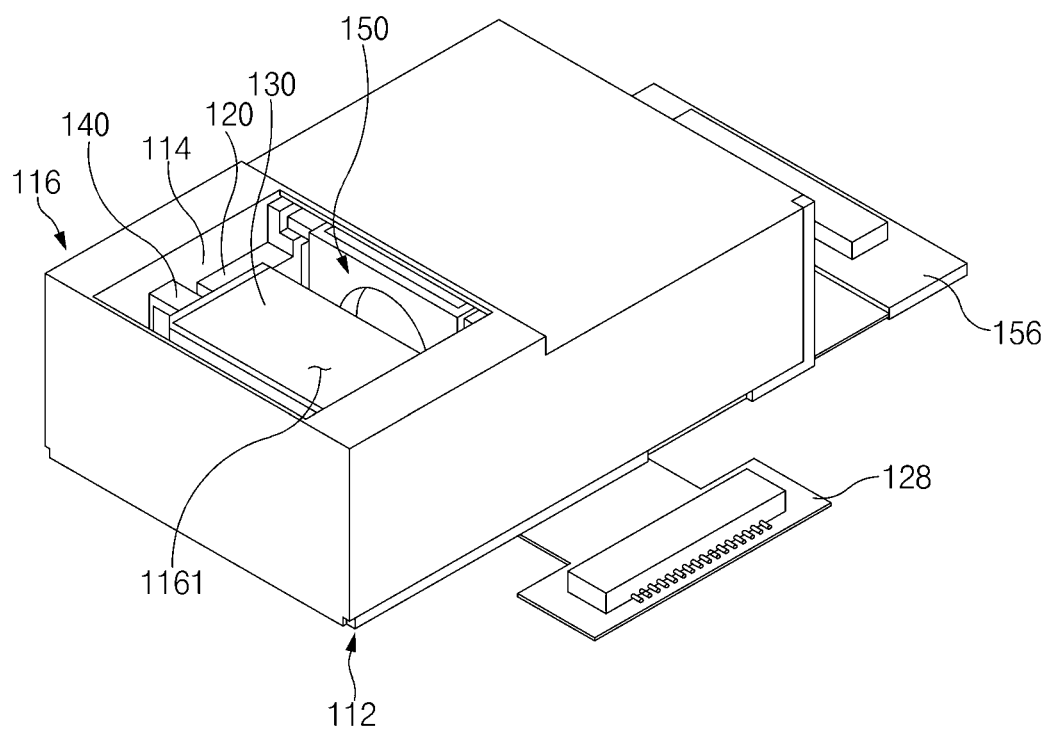
FIG. 1 is a perspective view of a camera assembly according to an embodiment.

Hereinafter, various embodiments of the disclosure may be described with reference to accompanying drawings. Accordingly, those of ordinary skill in the art will recognize that modifications, equivalents, and/or alternatives on the various embodiments described herein can be variously made without departing from the scope and spirit of the disclosure.

According to an embodiment, a camera assembly 100 may include a frame 110, an upper cover 116 coupled to an upper portion of the frame 110, a lens module 150 disposed in the frame 110, a reflective member 130 that changes an optical path, a holder 140 in which the reflective member 130 is disposed, and a linear actuator module that actuates rotation of the reflective member 130.

FIG. 1 is a perspective view of the camera assembly 100 according to an embodiment.

Hereinafter, based on FIG. 1, a direction in which a second circuit board 156 is disposed is referred to a rearward direction, and a direction in which an opening 1161 is formed is referred to as an upward direction.

Referring to FIG. 1, the camera assembly 100 according to an embodiment may include the cover 116 and a base 112. The opening 1161 may be formed in the cover 116. External light may be incident into the cover 116 through the opening 1161. The reflective member 130 may be disposed under the opening 1161. The external light incident through the opening 1161 may be incident on the reflective member 130.

The camera assembly 100 may include a first circuit board 128 disposed on a lower side thereof and the second circuit board 156 disposed on a rear side thereof. As will be described below, the first circuit board 128 may drive the linear actuator module, and the second circuit board 156 may be electrically connected with an image sensor 154.

Figure 2:
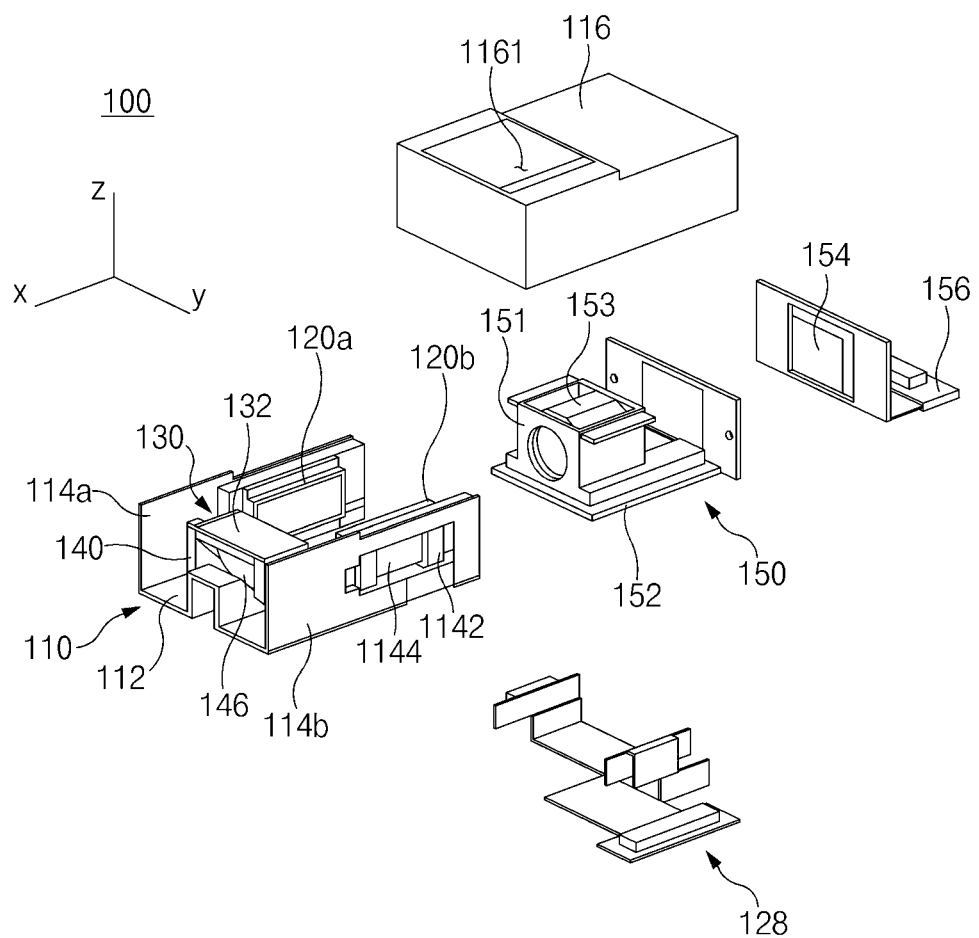
FIG. 2 is an exploded perspective view of the camera assembly according to an embodiment.

FIG. 2 is an exploded perspective view of the camera assembly 100 according to an embodiment.

In FIG. 2, xyz coordinate axes are illustrated. A first axis of rotation set forth herein may refer to an axis parallel to the y axis, and a second axis of rotation may refer to an axis parallel to the x axis. The z axis may be formed parallel to an optical axis of the lens module. Accordingly, the first axis of rotation, the second axis of rotation, and the optical axis of the lens module may be perpendicular to one another.

Referring to FIG. 2, the camera assembly 100 according to an embodiment may include the frame 110, the cover 116 coupled to the upper portion of the frame 110, the reflective member 130 that directs the external light incident through the opening 1161 toward the lens module 150, the holder 140 in which the reflective member 130 is disposed and that is disposed in the frame 110, the lens module 150, and the image sensor 154.

The opening 1161 may be formed in the upper cover 116. The reflective member 130 may be exposed to the outside through the opening 1161. The external light may be incident on the reflective member 130 through the opening 1161.

The cover 116 may be coupled to the upper portion of the frame 110, and the holder 140, the reflective member 130, the lens module 150, and the image sensor 154 may be provided in an interior space 1121 formed by that the frame 110 and an upper portion. In the frame 110, the holder 140, the lens module 150, and the image sensor 154 may be disposed in order from front to rear.

The frame 110 may include the base 112, and a first sidewall 114a and a second sidewall 114b formed on opposite sides of the base 112. The first sidewall 114a and the second sidewall 114b may face each other. The first sidewall 114a and the second sidewall 114b may be disposed perpendicular to the base 112. The first sidewall 114a and the second sidewall 114b may be disposed parallel to each other.

The holder 140 and the lens module 150 may be disposed on the base 112. The holder 140 may be disposed at the front, and the lens module 150 may be disposed at the rear. The holder 140 may be disposed between the first sidewall 114a and the second sidewall 114b.

An inclined surface 1122 may be formed on the base 112. The inclined surface 1122 may be formed at the front of the base 112. The inclined surface 1122 may be inclined upward with respect to the direction from the rear to the front of the base 112. The holder 140 may be supported on the inclined surface 1122. As will be described below, a yoke 1124 may be disposed in the space 1121 under the inclined surface 1122. A support recess 1123 where at least part of a support ball 146 of the holder 140 is inserted and supported may be formed on the inclined surface 1122.

Movable members 120 may be coupled to sidewalls 114. The movable members 120 may be coupled to the sidewalls 114 so as to slide forward or rearward relative to the sidewalls 114. First guide grooves 1143 by which movements of the movable members 120 are guided may be formed on the sidewalls 114. As will be described below, first corresponding guide grooves 121 that correspond to the first guide grooves 1143 may be formed on surfaces of the movable members 120 that face the sidewalls 114, and rolling members 125 may be disposed between the first guide grooves 1143 and the first corresponding guide grooves 121. Metal plates 1144 and coils 1142 wound around the metal plates 1144 may be formed in the sidewalls 114. Openings 1141 may be formed in the sidewalls 114. The metal plates 1144 may include yokes. The yokes and the coils 1142 may be disposed in the openings 1141.

In some embodiments, the camera assembly 100 may include a housing having the opening 1161 formed in one surface thereof. In this case, the housing may be a structure including the frame 110 and the upper cover 116.

The movable members 120 may be coupled to the sidewalls 114 so as to slide forward or rearward relative to the sidewalls 114. The movable members 120 may include magnetic bodies 122 on the sidewalls 114. The magnetic bodies 122 may electromagnetically interact with the coils 1142 disposed in the sidewalls 114.

The reflective member 130 may be disposed in the holder 140. The holder 140, together with the reflective member 130, may rotate about the first axis of rotation and the second axis of rotation that are perpendicular to an optical axis direction of the lens module 150. The holder 140 may include a support part for supporting the rotation of the holder 140. The support part may be supported by the inclined surface 1122 formed on the base 112 as described above. For example, the support part may include the support ball 146 having a ball shape.

The lens module 150 may include a lens plate 152, a lens housing 151 that is disposed on the lens plate 152 and that includes at least one lens 153 inside, the image sensor 154 disposed behind the lens housing 151 and coupled to the lens plate 152, and the second circuit board 156 connected with the image sensor 154.

Figure 3A:
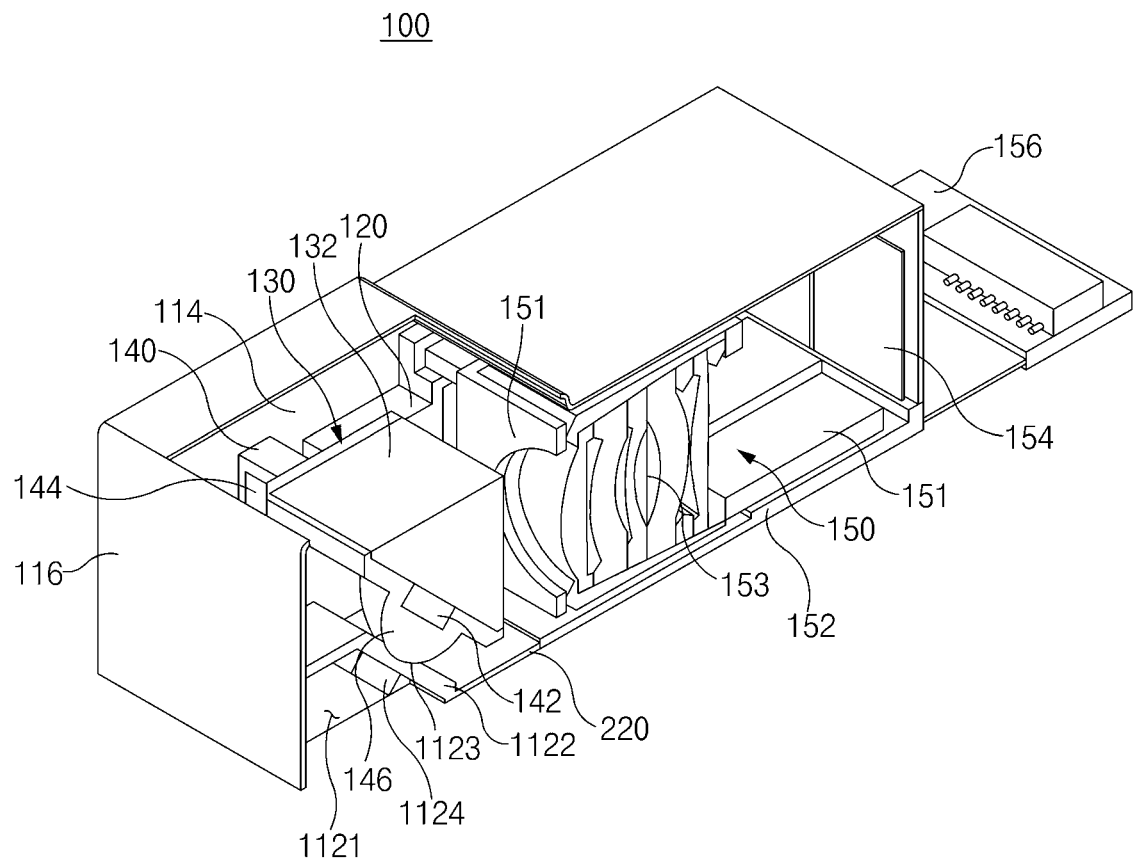
FIG. 3A is a sectional view of the camera assembly according to an embodiment.
Figure 3B:
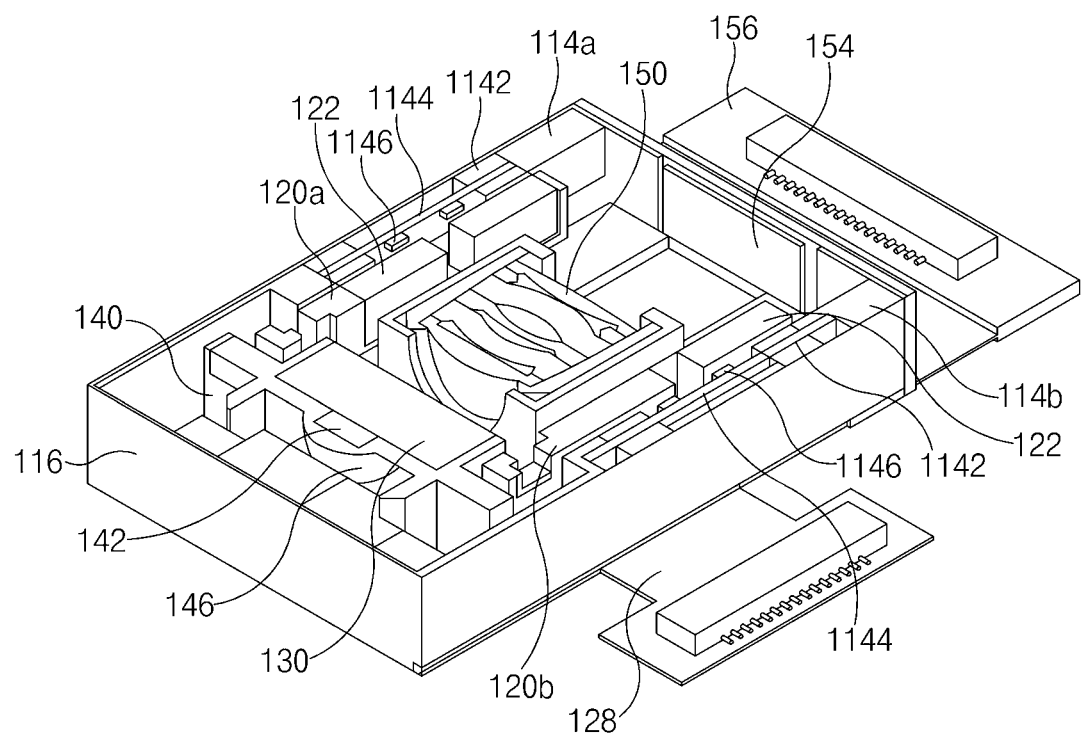
FIG. 3B is a sectional view of the camera assembly according to an embodiment.

FIGS. 3A and 3B are sectional views of the camera assembly 100 according to an embodiment.

In an embodiment, the frame 110 may include the first sidewall 114a and the second sidewall 114b facing the first sidewall 114a. The base 112 may be formed between the first sidewall 114a and the second sidewall 114b. The holder 140, the reflective member 130, and the lens module 150 may be disposed on the base 112 disposed between the first sidewall 114a and the second sidewall 114b.

Referring to FIGS. 3A and 3B, the support recess 1123 may be formed on the inclined surface 1122 formed on the base 112. The support recess 1123 may be formed in a ball shape so as to correspond to the support ball 146. The support ball 146 of the holder 140 may be disposed in the support recess 1123. At least part of the support ball 146 may be inserted into the support recess 1123. The support ball 146 having a ball shape may support the holder 140 to enable the holder 140 to rotate in at least two degrees of freedom. The first axis of rotation and the second axis of rotation may be virtual axes of rotation that are perpendicular to each other and that are formed perpendicular to the optical axis direction (the forward/rearward direction) of the lens module 150. The virtual first axis of rotation and the virtual second axis of rotation may be virtual axes of rotation that pass through the support ball 146 of the holder 140. The yoke 1124 may be disposed under the inclined surface 1122.

The reflective member 130 may be disposed in the holder 140. The reflective member 130 may include a first surface 132 on which the external light is incident and a second surface 134 that faces the lens module 150. The first surface 132 and the second surface 134 may be referred to as a light entrance surface and a light exit surface, respectively. The first surface 132 and the second surface 134 may be connected with each other at a predetermined angle. The first surface 132 and the second surface 134 may preferably be connected to be perpendicular to each other.

In various embodiments, the reflective member 130 may include a prism. The reflective member 130 may include a third surface 136 that connects the first surface 132 and the second surface 134. The third surface 136 may be supported by the holder 140. The third surface 136 may be obliquely formed to connect the first surface 132 and the second surface 134.

In an embodiment, the holder 140 may include a first magnet 142 and second magnets 144. The first magnet 142 may be formed inside the support ball 146. The second magnets 144 may be disposed on opposite sides of the holder 140 with respect to the support ball 146. Magnet mounting recesses 143 may be formed on the opposite sides of the holder 140 with respect to the support ball 146. The second magnets 144 may be disposed in the magnet mounting recesses 143.

The first magnet 142 of the holder 140 may electromagnetically interact with the yoke 1124 disposed under the inclined surface 1122. An attraction force and/or a repulsive force may act between the first magnet 142 of the holder 140 and the yoke 1124 disposed under the inclined surface 1122. Rotation of the holder 140 may be supported by the force.

The support ball 146 of the holder 140 may be disposed such that part of the support ball 146 is inserted into the support recess 1123 on the inclined surface 1122. Accordingly, rotation of the holder 140 and the reflective member 130 may be supported by the support recess 1123 and the support ball 146.

The lens module 150 may be disposed behind the holder 140 and the reflective member 130. The lens module 150 may include the lens housing 151 having the lens inside, the lens plate 152 on which the lens housing 151 is disposed, and the image sensor 154 disposed behind the lens housing 151.

The lens housing 151 may be coupled to the lens plate 152 so as to be movable relative to the lens plate 152. The lens plate 152 may be connected with and fixed to the base 112 of the frame 110. Alternatively, the base 112 of the frame 110 may extend to form the lens plate 152. The position of the lens plate 152 may be fixed in the camera assembly 100, and the lens housing 151 and the at least one lens 153 provided in the lens housing 151 may move in the optical axis direction. The optical axis direction may refer to the forward or rearward direction in the drawings.

The image sensor 154 and the second circuit board 156 may be coupled to the lens plate 152. Accordingly, the image sensor 154 and the second circuit board 156 may be fixed, and only the lens housing 151 and the lens 153 may move in the optical axis direction. As the lens 153 moves relative to the lens plate 152, the camera assembly 100 may be focused.

Referring to FIG. 3B, a first movable member 120a and a second movable member 120b may be coupled to the first sidewall 114a and the second sidewall 114b, respectively. The movable members 120 may be coupled so as to slide forward or rearward relative to the sidewalls 114.

In various embodiments, driving forces of the movable members 120 may be formed by magnets and the coils 1142. Referring to FIG. 3B, the metal plate 1144 and at least one coil 1142 wound around the metal plate 1144 may be disposed in the first sidewall 114a and the second sidewall 114b. Furthermore, the magnets facing the coils 1142 may be disposed on the first movable member 120a and the second movable member 120b.

Sensors 1146 may be disposed on the metal plates 1144. The sensors 1146 may sense displacements of the movable members 120. The sensors 1146 may include Hall sensors. The sensors 1146 may be formed in the sidewalls 114 and may be fixed in position, and the movable members 120 may move relative to the sensors 1146. When the movable members 120 move, magnetic flux densities may be changed by movements of the magnetic bodies 122, and the Hall sensors may measure the magnetic flux density changes.

Figure 4:
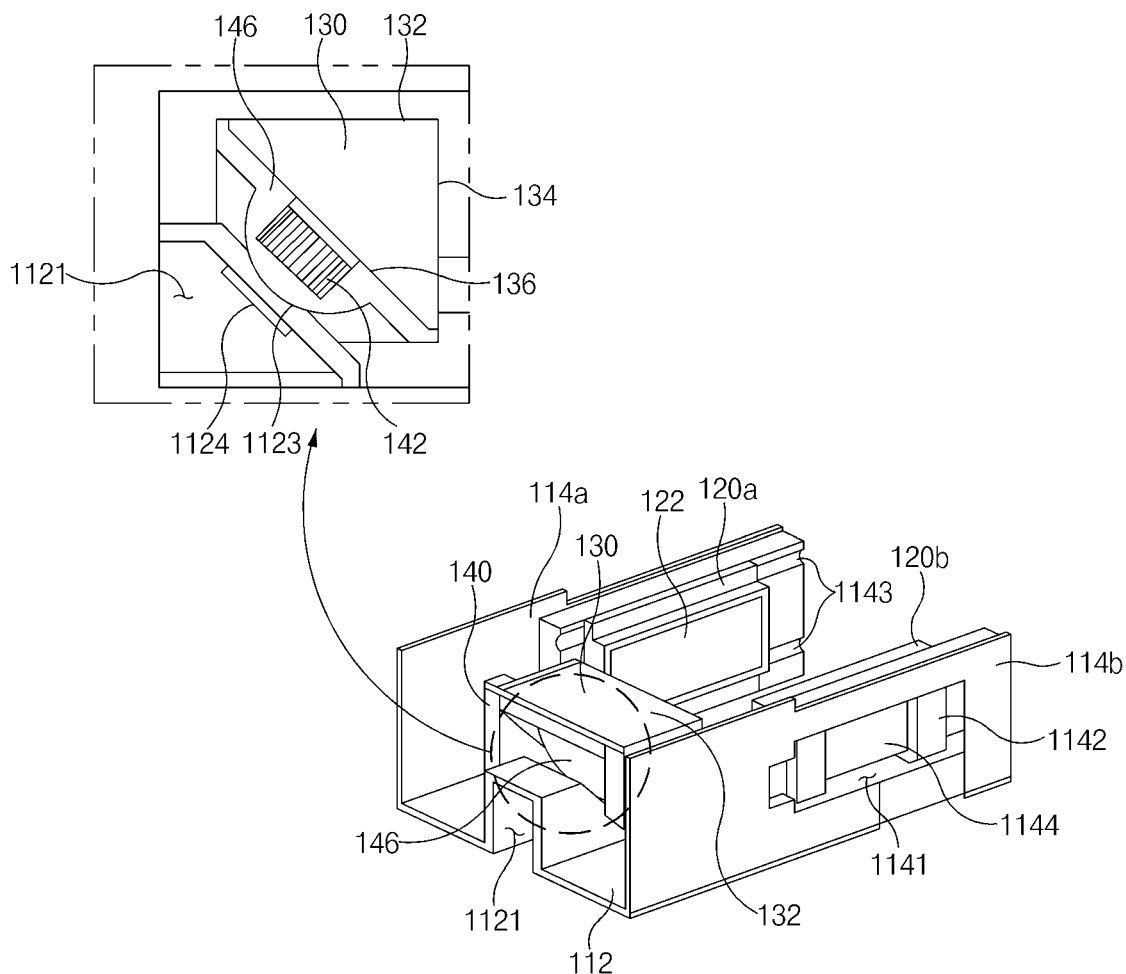
FIG. 4 is a view illustrating part of the camera assembly according to an embodiment.
Figure 5:
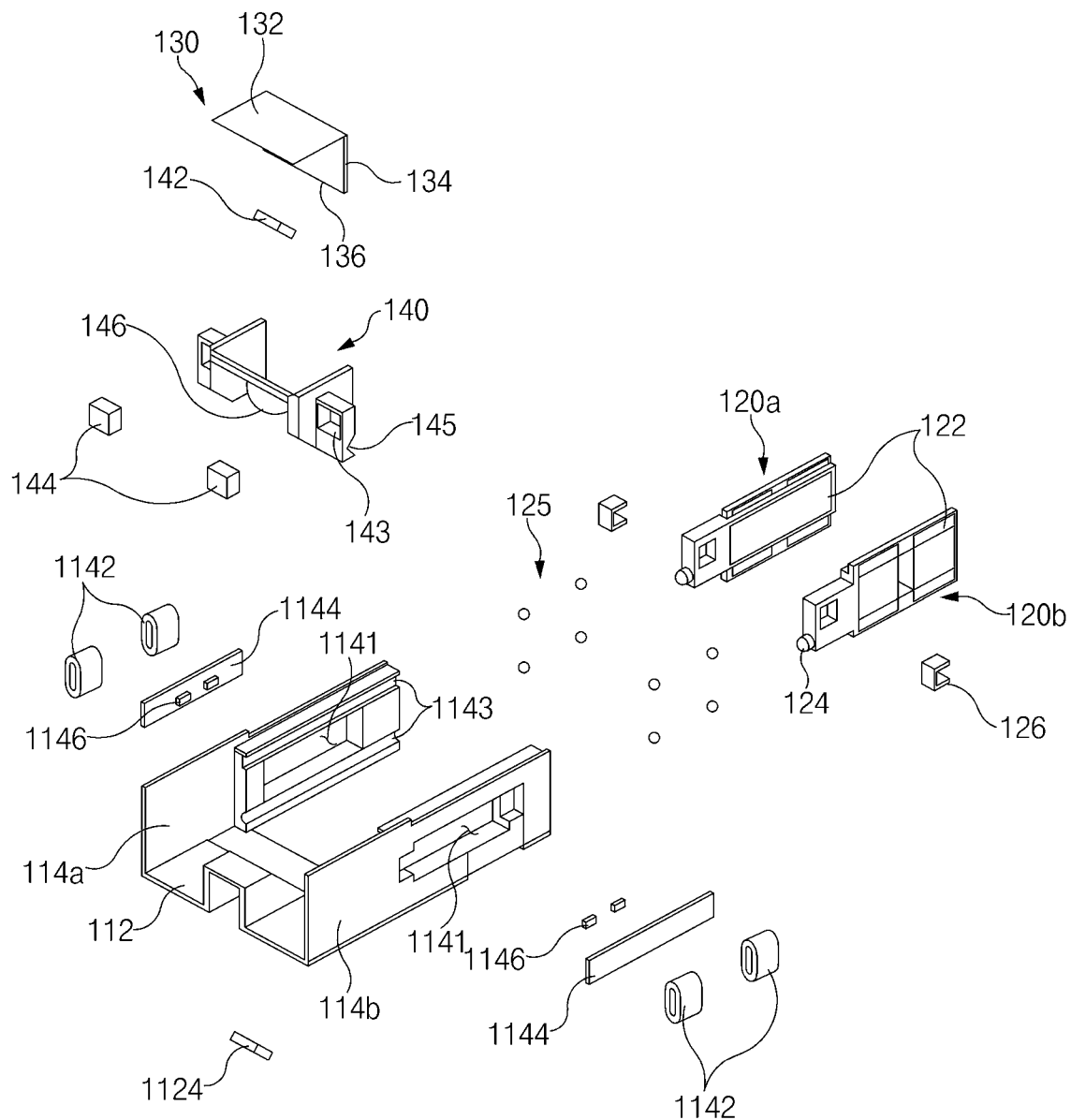
FIG. 5 is an exploded perspective view of FIG. 4.

FIG. 4 is a view illustrating part of the camera assembly 100 according to an embodiment. FIG. 5 is an exploded perspective view of FIG. 4.

Referring to FIGS. 4 and 5, the inclined surface 1122 may be formed on the base 112. The yoke 1124 may be disposed in the space 1121 formed by the inclined surface 1122. The first magnet 142 interacting with the yoke 1124 may be disposed on the holder 140. The support recess 1123 in which the support ball 146 of the holder 140 is disposed may be formed on the inclined surface 1122. The yoke 1124 may include a magnetic body.

In various embodiments, the reflective member 130 may include a prism. The reflective member 130 may include the first surface 132 on which the external light is incident, the second surface 134 vertically connected to the first surface 132, and the third surface 136 connecting the first surface 132 and the second surface 134. The third surface 136 of the reflective member 130 may be seated on the holder 140. For example, the first surface 132 may serve as a light entrance surface, the second surface 134 may serve as a light exit surface, and the third surface 136 may serve as a reflective surface. The first surface 132 and the second surface 134 of the reflective member 130 are not necessarily limited to being connected to be perpendicular to each other, and the first surface 132 and the second surface 134 may be connected at various angles.

In various embodiments, the reflective member 130 may include a mirror. The mirror may change the optical path of the external light incident through the opening 1161 formed in an upper wall of the cover 116. For example, the external light may reach the reflective member 130 through the opening 1161 formed in the upper wall of the cover 116, and the light reflected by the mirror may reach the lens 153.

The reflective member 130 may change the optical path of the external light to direct the external light toward the lens 153. For example, the reflective member 130 may include a reflective surface (e.g., the third surface 136 of FIG. 4). The reflective surface may be disposed to form a predetermined angle with the external light. The reflective surface may face the opening 1161 formed in the upper wall of the cover 116 and the lens 153 disposed in the cover 116.

In various embodiments, the reflective member 130 may be implemented with only the third surface 136 without including the first surface 132 and/or the second surface 134. For example, the reflective member 130 may include a mirror, and the third surface 136 may include a reflective surface.

The first movable member 120a and the second movable member 120b may be slidably coupled to the first sidewall 114a and the second sidewall 114b, respectively. The first guide grooves 1143 for guiding movements of the first movable member 120a and the second movable member 120a may be formed on the first sidewall 114a and the second sidewall 114b. For example, the first movable member 120a and the second movable member 120b may be inserted into the first guide grooves 1143 and may move forward or rearward.

The first movable member 120a and the second movable member 120b may be connected to connecting parts of the holder 140. Referring to FIG. 5, connecting recesses 145 may be formed on the connecting parts of the holder 140. Protrusions 124 protruding in a ball shape may be formed on front end portions of the first movable member 120a and the second movable member 120b. The protrusions 124 may be disposed such that parts thereof are inserted into the connecting recesses 145.

The first movable member 120a and the second movable member 120b may further include yokes 126 disposed in positions adjacent to the protrusions 124, respectively. Attraction forces may act between the yokes 126 and the second magnets 144 of the holder 140. The second magnets 144 may attract the holder 140 rearward when the first movable member 120a and the second movable member 120b move rearward. The yokes 126 may include magnetic bodies.

The support ball 146 of the holder 140 may be disposed such that part of the support ball 146 is inserted into the support recess 1123 on the inclined surface 1122. Accordingly, rotation of the holder 140 and the reflective member 130 may be supported by the support recess 1123 and the support ball 146.

In various embodiments, the second magnets 144 and the yokes 126 may be omitted. For example, the holder 140 and the movable members 120 may be connected such that the holder 140 moves rearward together with the movable members 120 even in a case where the first movable member 120a and the second movable member 120b move rearward. In this case, the holder 140 may move together depending on displacements of the movable members 120, and therefore the second magnets 144 and the yokes 126 for pressing the holder 140 backward may be omitted. The movable members 120, when moving forward, may press the holder 140 forward as described above.

Figure 6:
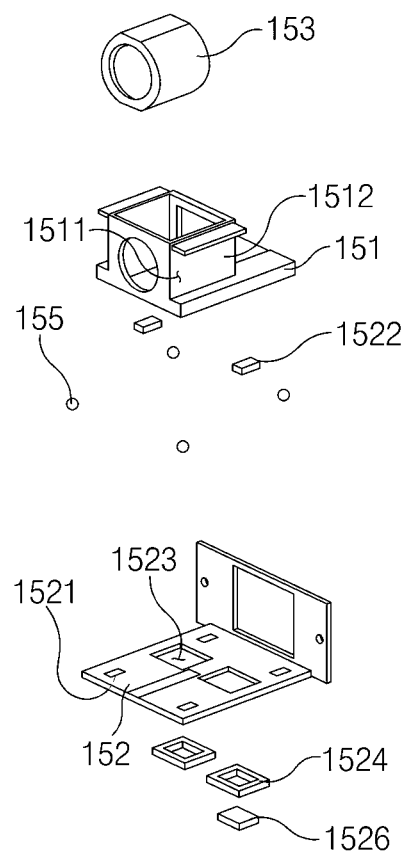
FIG. 6 is a view illustrating a lens module of the camera assembly according to an embodiment.

FIG. 6 is a view illustrating the lens module 150 of the camera assembly 100 according to an embodiment.

The lens module 150 may include the lens plate 152, the lens housing 151 disposed on the lens plate 152, the at least one lens 153 provided in the lens housing 151, and the image sensor 154 disposed behind the lens housing 151.

At least one opening 1523 into which a coil 1524 is inserted may be formed in the lens plate 152. The coil 1524 may be formed by being wound around a yoke 1526. Second corresponding guide grooves 1521 in which rolling members 155 are disposed may be formed on the lens plate 152. Second guide grooves 1513 corresponding to the second corresponding guide grooves 1521 may be formed on the lens housing 151. The rolling members 155 may be disposed between the second guide grooves 1513 and the second corresponding guide grooves 1521 and may decrease frictional forces generated when the lens housing 151 moves.

A magnetic body 1522 corresponding to the coil 1524 of the lens plate 152 may be disposed on the lens housing 151. The magnetic body 1522 may be disposed on a lower surface of the lens housing 151 that faces the lens plate 152.

A magnetic field may be formed between the lens housing 151 and the lens plate 152 by the magnetic body 1522 of the lens housing 151. In this case, when current flows through the coil 1524 of the lens plate 152, a Lorentz force may act on the coil 1524 of the lens plate 152. Because the lens plate 152 is connected and fixed to the base 112, the lens housing 151 may move forward or rearward.

Sliding grooves 1511 may be formed on side surfaces 1512 of the lens housing 151. As will be described below, at least parts of the movable members 120 may be inserted into the sliding grooves 1511. The movable members 120 and the lens housing 151 that move forward or rearward may be supported or guided by the sliding grooves 1511.

Figure 7:
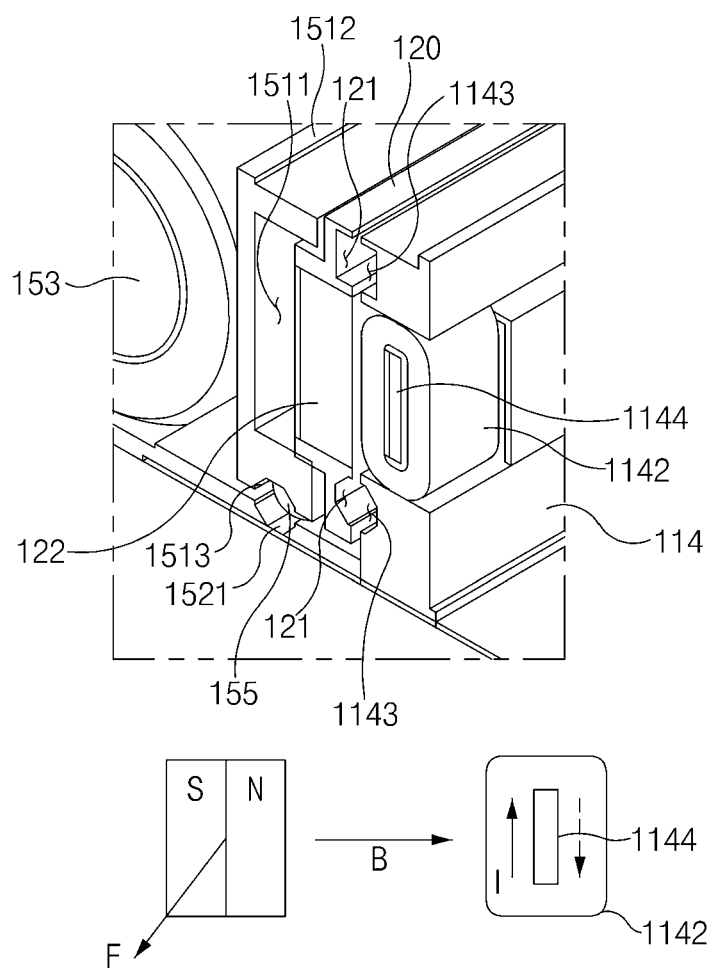
FIG. 7 is a view illustrating a coupling of sidewalls, movable members, a lens housing, and a lens plate of the camera assembly according to an embodiment.

FIG. 7 is a view illustrating a coupling of the sidewalls 114, the movable members 120, the lens housing 151, and the lens plate 152 of the camera assembly 100 according to an embodiment.

In an embodiment, the camera assembly 100 may include a first linear actuator module for actuating the first movable member 120a and a second linear actuator module for actuating the second movable member 120b.

The first linear actuator module and the second linear actuator module may include the coils 1142 formed in the sidewalls 114 and the magnetic bodies 122 formed on the movable members 120 facing the sidewalls 114. The coils 1142 may preferably be formed by being wound around yokes.

The first guide grooves 1143 may be formed on the sidewalls 114. The first corresponding guide grooves 121 that correspond to the first guide grooves 1143 may be formed on the movable members 120. The first guide grooves 1143 and the first corresponding guide grooves 121 may be disposed to face each other. The rolling members 125 may be disposed between the first guide grooves 1143 and the first corresponding guide grooves 121. The rolling members 125 may include balls. When the movable members 120 move forward or rearward relative to the sidewalls 114, frictional forces may be decreased by the rolling members 125.

The sliding grooves 1511 may be formed on the side surfaces 1512 of the lens housing 151. At least parts of the movable members 120 may be inserted into the sliding grooves 1511. Accordingly, movements of the movable members 120 that move forward or rearward may be additionally guided.

The lens module 150 may include the lens plate 152 and the lens housing 151 disposed on the lens plate 152. The second guide grooves 1513 may be formed on the lower surface of the lens housing 151. The second corresponding guide grooves 1521 may be formed on the lens plate 152. Likewise to the first guide grooves 1143 and the first corresponding guide grooves 121, the second guide grooves 1513 and the second corresponding guide grooves 1521 may be disposed to face each other. The rolling members 155 may be disposed between the second guide grooves 1513 and the second corresponding guide grooves 1521. Accordingly, the lens housing 151 may be movable forward or rearward relative to the lens plate 152.

The magnetic bodies 122 formed on the movable members 120 may include N-pole areas facing the sidewalls 114 and S-pole areas facing the lens housing 151. Magnetic fields B facing toward the sidewalls 114 may be formed by the N-pole areas. At this time, Lorentz forces may act on the coils 1142 through which currents flow in the magnetic fields. For example, when current flows through the coil 1142 in the clockwise direction (when current flows upward in the drawing), a Lorentz force acting in the rearward direction may act on the coil 1142 and the sidewall 114 in which the coil 1142 is disposed. At this time, the movable member 120 slidably coupled to the sidewall 114 may move forward because the sidewall 114 is fixed to the base 112. Accordingly, when current flows through the coil 1142 in the counterclockwise direction, the movable member 120 may move in the opposite direction.

The movable members 120 may include the first movable member 120a and the second movable member 120b, and the sidewalls 114 may include the first sidewall 114a and the second sidewall 114b. Currents may flow through the coils 1142, which are included in the first sidewall 114a and the second sidewall 114b, in different directions, and the first movable member 120a and the second movable member 120b may move in different directions.

Meanwhile, as described above, the sliding grooves 1511 may be formed on the side surfaces 1512 of the lens housing 151. At least parts of the movable members 120 may be inserted into the sliding grooves 1511. Accordingly, movements of the movable members 120 and the lens housing 151 that move forward or rearward may be guided or supported by each other.

FIG. 8 illustrates a front surface and a rear surface of an electronic device according to another embodiment.

The electronic device 200 according to the other embodiment will be described with reference to FIG. 8. The electronic device 200 according to the other embodiment may include a housing and a camera assembly provided in the housing.

The housing may include a front surface 201 and a rear surface 202, and openings may be formed in partial areas of the front surface 201 and the rear surface 202 of the housing. The camera assembly may be disposed in the housing. A display area 203 may be formed on the front surface 201.

The camera assembly 100 may include at least some of the above-described components. The optical axis of the lens of the camera assembly 100 may be formed between the front surface and the rear surface of the housing. The lens and the image sensor of the camera assembly may be disposed in the housing, and the holder and the reflective member 130 disposed in the optical axis direction of the lens may be disposed under the opening such that at least parts thereof are exposed through the opening.

External light may be incident on the reflective member through the opening formed in the front surface or the rear surface of the electronic device. The path of the external light may be changed by the reflective member. The reflective member may allow the external light to pass between the front surface and the rear surface of the housing and reach the lens.

Based on FIG. 8, the first movable member and the second movable member may be actuated in the up/down direction, and the optical axis direction of the lens may also be formed in the up/down direction of the electronic device.

As described above, the reflective member and the holder may be rotated about the first axis of rotation and the second axis of rotation by movements of the first movable member and the second movable member. In this case, the first axis of rotation may be formed in a direction to pass through the front surface and the rear surface of the electronic device. The second axis of rotation may be formed in a direction to pass through opposite side surfaces disposed between the front surface and the rear surface of the electronic device. The first axis of rotation and the second axis of rotation may be perpendicular to each other, and both the first axis of rotation and the second axis of rotation may be perpendicular to the up/down direction of the electronic device.

The camera assembly 100 of the electronic device 200 according to the other embodiment may have two or more rotational degrees of freedom and may thus have a wide angle of view. In this case, an increase in the thickness of the electronic device may be minimized by forming the optical axis of the lens module in the lengthwise direction (the vertical direction of FIG. 8) or the widthwise direction (the horizontal direction of FIG. 8) of the housing.

Figure 9A:
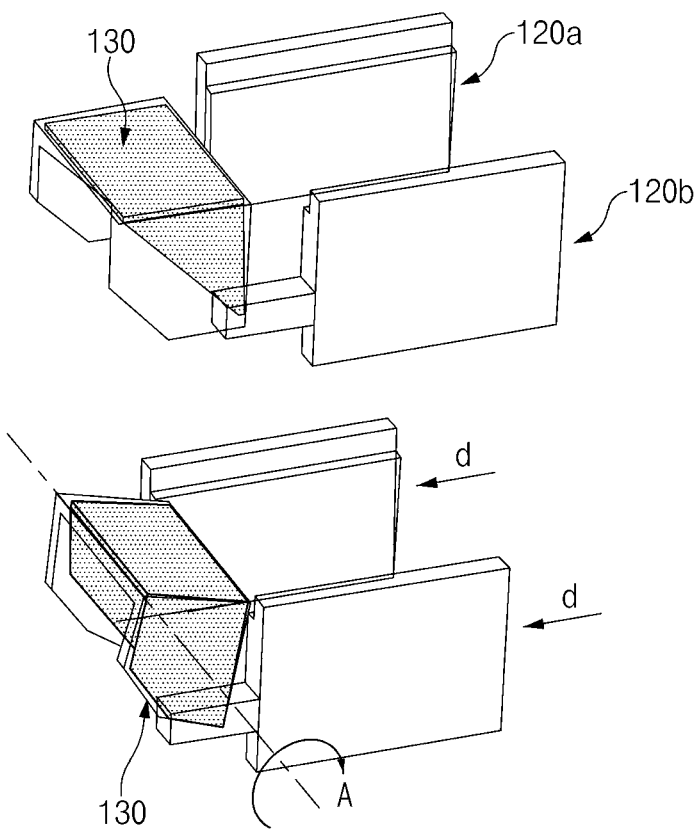
FIG. 9A is a view illustrating an operation of a reflective member depending on movements of the movable members of the camera assembly according to an embodiment.
Figure 9B:
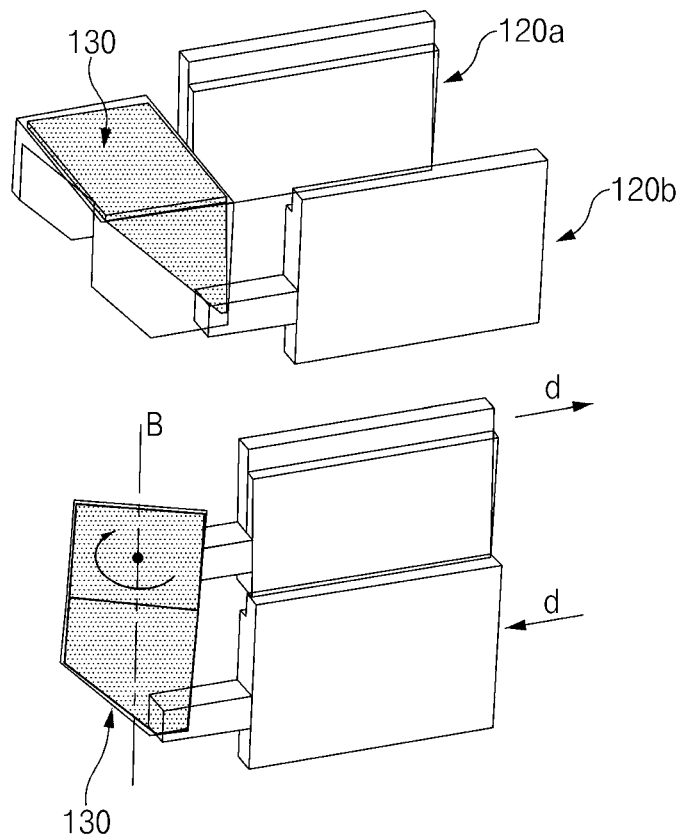
FIG. 9B is a view illustrating an operation of the reflective member depending on movements of the movable members in an embodiment.
Figure 10:
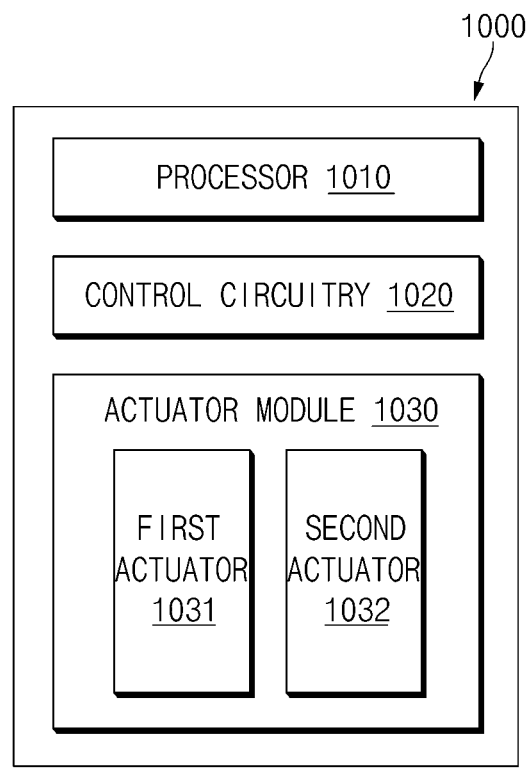
FIG. 10 is a block diagram of an electronic device according to various embodiments.
Figure 11:
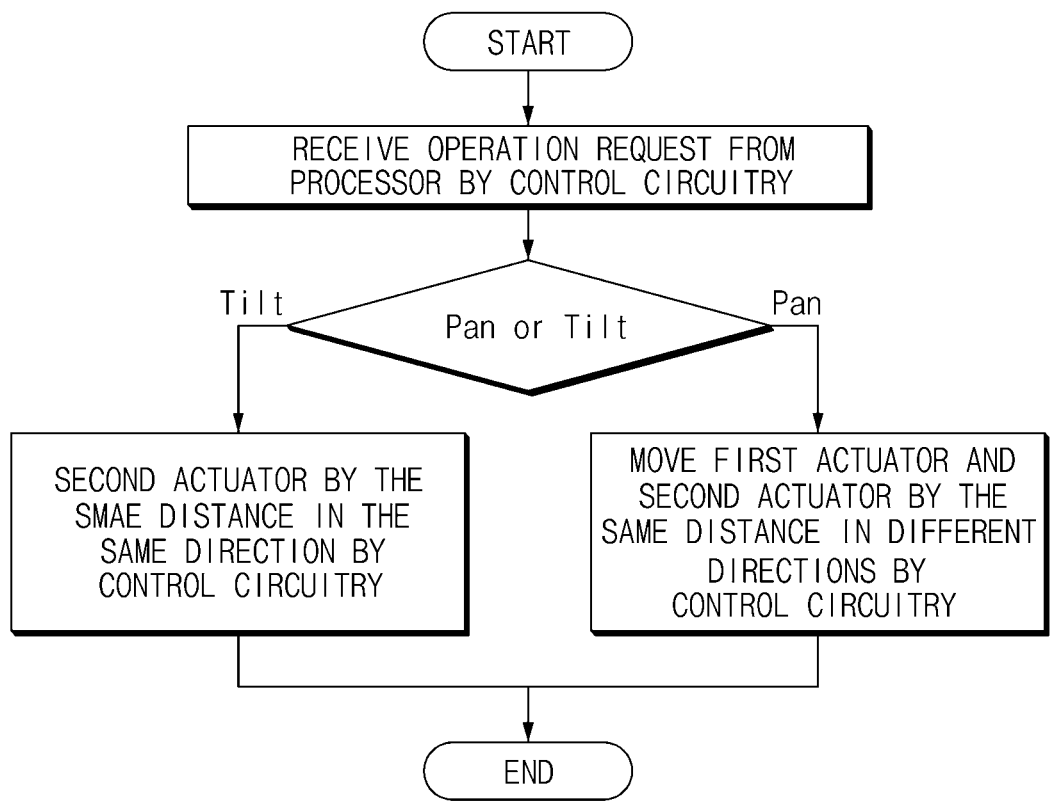
FIG. 11 is a flowchart of the electronic device according to various embodiments.

FIGS. 9A and 9B are views illustrating rotations of the reflective member depending on movements of the first movable member and the second movable member in an embodiment. FIG. 9A illustrates a tilting operation, and FIG. 9B illustrates a panning operation. FIG. 10 is a block diagram of an electronic device according to another embodiment. FIG. 11 is a flowchart of the electronic device according to the other embodiment.

Hereinafter, in FIGS. 9 to 11, to define tilting and panning, the leftward direction of the camera assembly 100 illustrated in FIG. 9A (the direction in which the reflective member 130 is located) is defined as the forward direction, and the rightward direction is defined as the rearward direction.

As illustrated in FIG. 9A, a tilting operation may refer to an operation in which the reflective member 130 rotates upward and downward with respect to the front of the camera assembly 100. During the tilting operation, the reflective member 130 may rotate about the first axis of rotation (an axis A). The first axis of rotation may be formed inside a support ball (e.g., the support ball 146 of FIG. 3A) that supports the rotation of the reflective member 130, or may be formed adjacent to the support ball.

As illustrated in FIG. 9B, a panning operation may refer to an operation in which the reflective member 130 rotates leftward and rightward with respect to the front of the camera assembly 100. During the panning operation, the reflective member 130 may rotate about the second axis of rotation (an axis B). The second axis of rotation may be formed inside the support ball (e.g., the support ball 146 of FIG. 3A) that supports the rotation of the reflective member 130, or may be formed adjacent to the support ball.

Tilting and panning may be differently defined depending on a direction in which the camera assembly 100 is disposed. The camera assembly 100 according to an embodiment of the disclosure may have at least two rotational degrees of freedom and is not limited by a term, such as panning, tilting, or swiveling, which refers to a rotational direction.

Referring to FIG. 9A, when the first movable member 120a and the second movable member 120b move in the same direction, the reflective member 130 may rotate about the first axis of rotation (e.g., the axis A). As described above, each axis of rotation may be formed in the center of the support ball 146, and each rotation may be supported by the support ball 146.

Referring to FIG. 9B, when the first movable member 120a and the second movable member 120b move in different directions, the reflective member 130 may rotate about the second axis of rotation (e.g., the axis B).

The first movable member 120a and the second movable member 120b may be independently actuated depending on directions of currents flowing through the respective coils 1142. Accordingly, the reflective member 130 may be disposed at various angles depending on displacements of the movable members 120.

In various embodiments, when the movable members 120 move forward, the protrusions 124 on the front end portions of the movable members 120 may be inserted into the connecting recesses 145 of the holder 140 and may move the holder 140 forward. In contrast, when the movable members 120 move rearward, the protrusions 124 of the movable members 120 may be separated from the connecting recesses 145. The holder 140 may be moved rearward by pre-load parts when the movable members 120 move rearward as described above. That is, the pre-load parts (e.g., the second magnets 144 of the holder 140 and the yokes 126 of the movable members 120) may be configured to press the holder 140 rearward.

Referring to FIG. 10, in the other embodiment, the electronic device 1000 (e.g., the electronic device 200 of FIG. 8) may include a processor 1010 and control circuitry 1020 for controlling an actuator module 1030 of a camera assembly (e.g., the camera assembly 100 of FIGS. 9A and 9B).

The actuator module 1030 may include a first actuator 1031 and a second actuator 1032. As described above, the first actuator 1031 and the second actuator 1032 may linearly move in an optical axis direction (a forward or rearward direction) of a lens (e.g., the lens module 150 of FIG. 1) relative to sidewalls (e.g., the sidewalls 114 of FIG. 2) of the camera assembly (e.g., the camera assembly 100 of FIGS. 9A and 9B).

The first actuator (e.g., the first movable member 120a of FIGS. 9A and 9B) and the second actuator 132 (e.g., the second movable member 120b of FIGS. 9A and 9B) may be connected with a reflective member (e.g., the reflective member 130 of FIGS. 9A and 9B) or a holder in which the reflective member 130 is disposed and may rotate the reflective member about a first axis of rotation (e.g., the axis A of FIG. 9A) or a second axis of rotation (e.g., the axis B of FIG. 9B).

The control circuitry 1020 may independently drive the first actuator 1031 and the second actuator 1032. For example, the control circuitry 1020 may control the first actuator 1031 to move forward or rearward and may simultaneously or sequentially control the second actuator 1032 to move forward or rearward.

In various embodiments, the control circuitry 1020 may be included as a component of the camera assembly. Alternatively, the control circuitry 1020 may be integrated with the camera assembly. For example, a first circuit board (e.g., the first circuit board 128 of FIG. 1) may be disposed outside the first actuator 1031 and/or the second actuator 1032.

The electronic device 1000 may further include the processor 1010. The processor 1010 may be electrically connected with the control circuitry 1020 and may transmit instructions associated with driving the first actuator 1031 and the second actuator 1032 to the control circuitry 1020.

For example, when a user who uses the electronic device 1000 performs an operation of adjusting an angle of view of a camera (e.g., the camera assembly 100 of FIGS. 9A and 9B), the processor 1010 may transmit an operation request corresponding to the user's instruction to the control circuitry 1020.

In various embodiments, the operation request from the processor 1010 may include a first rotation angle of the reflective member (e.g., the reflective member 130 of FIGS. 9A and 9B) about the first axis of rotation (e.g., the axis A of FIG. 9A) and a second rotation angle of the reflective member about the second axis of rotation (e.g., the axis B of FIG. 9B). In this case, the processor 1010 may calculate the rotation angles of the reflective member 130, based on the user's instruction and may transmit the calculated rotation angles to the control circuitry 1020. In this case, the control circuitry 1020 may compute directions and distances where the first actuator 1031 and the second actuator 1032 are to move, based on the requested first rotation angle and the requested second rotation angle of the reflective member 130 and may drive the first actuator 1031 and the second actuator 1032 depending on the directions and the distances.

In various embodiments, the operation request from the processor 1010 may include directions and distances where the first actuator 1031 and the second actuator 1032 are to move. In this case, the processor 1010 may compute the first rotation angle and the second rotation angle that correspond to a user operation, may compute directions and distances where the first actuator 1031 and the second actuator 1032 are to move, based on the first rotation angle and the second rotation angle, and may transmit the directions and distances to the control circuitry 1020. The control circuitry 1020 may drive the first actuator 1031 and the second actuator 1032 depending on the computed directions and distances.

Referring to FIG. 11, the control circuitry 1020 may receive an operation request from the processor 1010 and may drive the first actuator 1031 and the second actuator 1032 forward or rearward.

The operation illustrated in FIG. 11 may be an example of a case in which only a tilting operation is performed or only a panning operation is performed, and the camera assembly according to various embodiments may simultaneously perform a tilting operation and a panning operation.

First, the control circuitry 1020 may determine whether the operation request from the processor 1010 corresponds to a panning operation or a tilting operation. In a case where the operation request from the processor 1010 corresponds to the tilting operation, the control circuitry 1020 may control the first actuator 1031 and the second actuator 1032 such that the first actuator 1031 and the second actuator 1032 move the same distance in the same direction. In a case where the operation request from the processor 1010 corresponds to the panning operation, the control circuitry 1020 may control the first actuator 1031 and the second actuator 1032 such that the first actuator 1031 and the second actuator 1032 move the same distance in different directions.

i) A Case where the First Actuator 1031 and the Second Actuator 1032 move the Same Distance in the Same Direction (e.g., FIG. 9A)

That is, this case may correspond to a case where the relative displacement between the first actuator 1031 and the second actuator 1032 is zero, and the reflective member (e.g., the reflective member 130 of FIG. 9A) may perform only a tilting operation. For example, in a case where both the first actuator 1031 (e.g., the first movable member 120*a* of FIG. 9A) and the second actuator 1032 (e.g., the second movable member 120*b* of FIG. 9A) move the same distance forward, the reflective member 130 may rotate about the first axis of rotation (e.g., the axis A of FIG. 9A) in the clockwise direction. For example, in a case where both the first actuator 1031 (e.g., the first movable member 120*a* of FIG. 9A) and the second actuator 1032 (e.g., the second movable member 120*b* of FIG. 9A) move the same distance rearward, the reflective member 130 may rotate about the first axis of rotation (e.g., the axis A of FIG. 9A) in the counterclockwise direction.

ii) A Case where the First Actuator 1031 and the Second Actuator 1032 move the Same Distance in Different Directions (e.g., FIG. 9B)

The reflective member (e.g., the reflective member 130 of FIG. 9A) may perform only a panning operation. For example, in a case where the first actuator 1031 (e.g., the first movable member 120*a* of FIG. 9B) moves forward and the second actuator 1032 (e.g., the second movable member 120*b* of FIG. 9B) moves the same distance rearward, the reflective member may rotate about the second axis of rotation (e.g., the axis B of FIG. 9B) in the counterclockwise direction (when the reflective member is viewed from above). For example, in a case where the first actuator 1031 (e.g., the first movable member 120*a* of FIG. 9B) moves rearward and the second actuator 1032 (e.g., the second movable member 120*b* of FIG. 9B) moves the same distance forward, the reflective member may rotate about the second axis of rotation (e.g., the axis B of FIG. 9B) in the clockwise direction (when the reflective member is viewed from above).

iii) A Case where the First Actuator 1031 and the Second Actuator 1032 move Different Distances The reflective member 130 may simultaneously perform a tilting operation and a panning operation. For example, in a case where the first actuator 1031 and the second actuator 1032 move forward, but the first actuator 1031 moves further forward than the second actuator 1032, the reflective member 130 may perform a tilting operation to rotate about the axis A in the clockwise direction and may perform a panning operation to rotate about the axis B in the counterclockwise direction.

Figure 12:
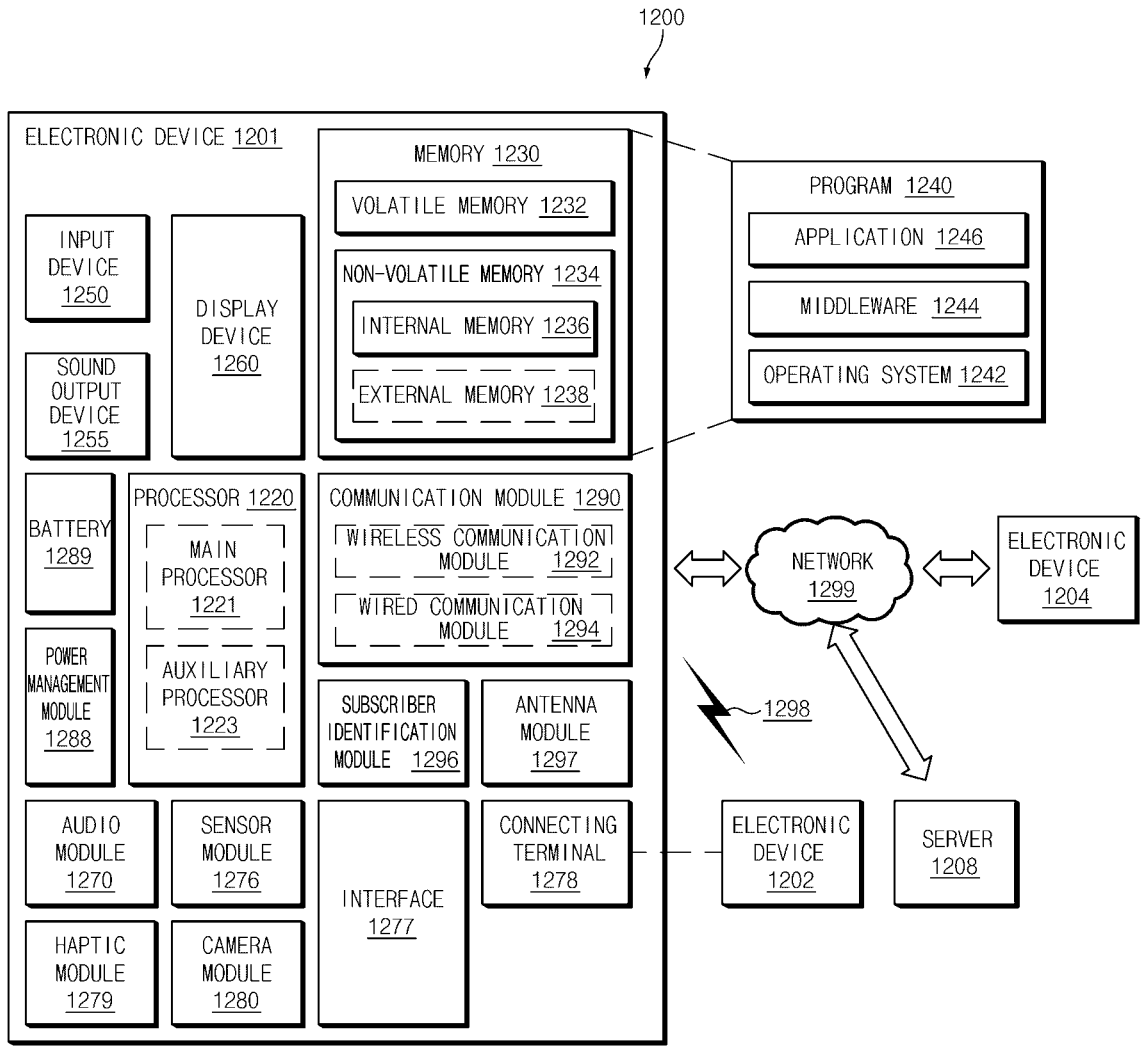
FIG. 12 is a block diagram illustrating an electronic device in a network environment according to various embodiments.

FIG. 12 is a block diagram illustrating an electronic device 1201 in a network environment 1200 according to various embodiments. Referring to FIG. 12, the electronic device 1201 in the network environment 1200 may communicate with an electronic device 1202 via a first network 1298 (e.g., a short-range wireless communication network), or an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, memory 1230, an input device 1250, a sound output device 1255, a display device 1260, an audio module 1270, a sensor module 1276, an interface 1277, a haptic module 1279, a camera module 1280, a power management module 1288, a battery 1289, a communication module 1290, a subscriber identification module (SIM) 1296, or an antenna module 1297. In some embodiments, at least one (e.g., the display device 1260 or the camera module 1280) of the components may be omitted from the electronic device 1201, or one or more other components may be added in the electronic device 1201. In some embodiments, some of the components may be implemented as single integrated circuitry. For example, the sensor module 1276 (e.g., a fingerprint sensor, an iris sensor, or an illuminance sensor) may be implemented as embedded in the display device 1260 (e.g., a display).

The processor 1220 may execute, for example, software (e.g., a program 1240) to control at least one other component (e.g., a hardware or software component) of the electronic device 1201 coupled with the processor 1220, and may perform various data processing or computation. According to one embodiment, as at least part of the data processing or computation, the processor 1220 may load a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), and an auxiliary processor 1223 (e.g., a graphics processing unit (GPU), an image signal processor (ISP), a sensor hub processor, or a communication processor (CP)) that is operable independently from, or in conjunction with, the main processor 1221. Additionally or alternatively, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display device 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input device 1250 may receive a command or data to be used by other component (e.g., the processor 1220) of the electronic device 1201, from the outside (e.g., a user) of the electronic device 1201. The input device 1250 may include, for example, a microphone, a mouse, a keyboard, or a digital pen (e.g., a stylus pen).

The sound output device 1255 may output sound signals to the outside of the electronic device 1201. The sound output device 1255 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1260 may visually provide information to the outside (e.g., a user) of the electronic device 1201. The display device 1260 may include, for example, a display, a hologram device, or a projector and control circuitry to control a corresponding one of the display, hologram device, and projector. According to an embodiment, the display device 1260 may include touch circuitry adapted to detect a touch, or sensor circuitry (e.g., a pressure sensor) adapted to measure the intensity of force incurred by the touch.

The audio module 1270 may convert a sound into an electrical signal and vice versa. According to an embodiment, the audio module 1270 may obtain the sound via the input device 1250, or output the sound via the sound output device 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to one embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The antenna module 1297 may transmit or receive a signal or power to or from the outside (e.g., the external electronic device) of the electronic device 1201. According to an embodiment, the antenna module 1297 may include an antenna including a radiating element composed of a conductive material or a conductive pattern formed in or on a substrate (e.g., PCB). According to an embodiment, the antenna module 1297 may include a plurality of antennas. In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the electronic devices 1202 and 1204 may be a device of a same type as, or a different type, from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, or client-server computing technology may be used, for example.

Figure 13:
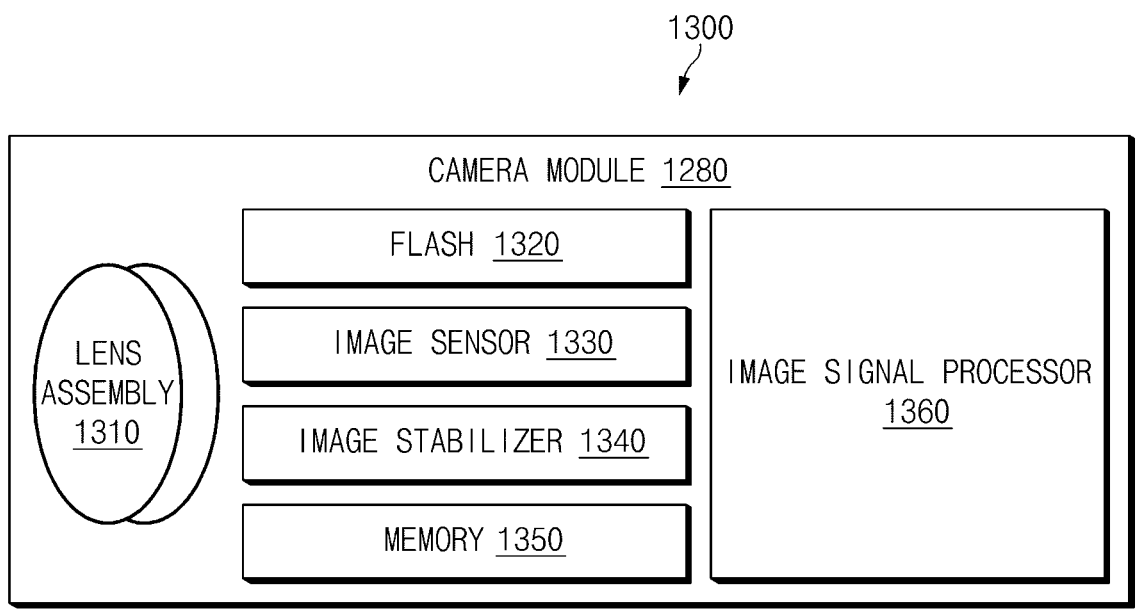
FIG. 13 is a block diagram illustrating a camera module according to various embodiments.

FIG. 13 is a block diagram 1300 illustrating the camera module 1280 according to various embodiments. Referring to FIG. 13, the camera module 1280 may include a lens assembly 1310, a flash 1320, an image sensor 1330, an image stabilizer 1340, memory 1350 (e.g., buffer memory), or an image signal processor 1360. The lens assembly 1310 may collect light emitted or reflected from an object whose image is to be taken. The lens assembly 1310 may include one or more lenses. According to an embodiment, the camera module 1280 may include a plurality of lens assemblies 1310. In such a case, the camera module 1280 may form, for example, a dual camera, a 360-degree camera, or a spherical camera. Some of the plurality of lens assemblies 1310 may have the same lens attribute (e.g., view angle, focal length, auto-focusing, f number, or optical zoom), or at least one lens assembly may have one or more lens attributes different from those of another lens assembly. The lens assembly 1310 may include, for example, a wide-angle lens or a telephoto lens.

The flash 1320 may emit light that is used to reinforce light reflected from an object. According to an embodiment, the flash 1320 may include one or more light emitting diodes (LEDs) (e.g., a red-green-blue (RGB) LED, a white LED, an infrared (IR) LED, or an ultraviolet (UV) LED) or a xenon lamp. The image sensor 1330 may obtain an image corresponding to an object by converting light emitted or reflected from the object and transmitted via the lens assembly 1310 into an electrical signal. According to an embodiment, the image sensor 1330 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1330 may be implemented using, for example, a charged coupled device (CCD) sensor or a complementary metal oxide semiconductor (CMOS) sensor.

The image stabilizer 1340 may move the image sensor 1330 or at least one lens included in the lens assembly 1310 in a particular direction, or control an operational attribute (e.g., adjust the read-out timing) of the image sensor 1330 in response to the movement of the camera module 1280 or the electronic device 1201 including the camera module 1280. This allows compensating for at least part of a negative effect (e.g., image blurring) by the movement on an image being captured. According to an embodiment, the image stabilizer 1340 may sense such a movement by the camera module 1280 or the electronic device 1201 using a gyro sensor (not shown) or an acceleration sensor (not shown) disposed inside or outside the camera module 1280. According to an embodiment, the image stabilizer 1340 may be implemented, for example, as an optical image stabilizer.

The memory 1350 may store, at least temporarily, at least part of an image obtained via the image sensor 1330 for a subsequent image processing task. For example, if image capturing is delayed due to shutter lag or multiple images are quickly captured, a raw image obtained (e.g., a Bayer-patterned image, a high-resolution image) may be stored in the memory 1350, and its corresponding copy image (e.g., a low-resolution image) may be previewed via the display device 1260. Thereafter, if a specified condition is met (e.g., by a user's input or system command), at least part of the raw image stored in the memory 1350 may be obtained and processed, for example, by the image signal processor 1360. According to an embodiment, the memory 1350 may be configured as at least part of the memory 1230 or as a separate memory that is operated independently from the memory 1230.

The image signal processor 1360 may perform one or more image processing with respect to an image obtained via the image sensor 1330 or an image stored in the memory 1350. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1360 may perform control (e.g., exposure time control or read-out timing control) with respect to at least one (e.g., the image sensor 1330) of the components included in the camera module 1280. An image processed by the image signal processor 1360 may be stored back in the memory 1350 for further processing, or may be provided to an external component (e.g., the memory 1230, the display device 1260, the electronic device 1202, the electronic device 1204, or the server 1208) outside the camera module 1280. According to an embodiment, the image signal processor 1360 may be configured as at least part of the processor 1220, or as a separate processor that is operated independently from the processor 1220. If the image signal processor 1360 is configured as a separate processor from the processor 1220, at least one image processed by the image signal processor 1360 may be displayed, by the processor 1220, via the display device 1260 as it is or after being further processed.

According to an embodiment, the electronic device 1201 may include a plurality of camera modules 1280 having different attributes or functions. In such a case, at least one of the plurality of camera modules 1280 may form, for example, a wide-angle camera and at least another of the plurality of camera modules 1280 may form a telephoto camera. Similarly, at least one of the plurality of camera modules 1280 may form, for example, a front camera and at least another of the plurality of camera modules 1280 may form a rear camera.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A camera assembly comprising:
   a frame including a first sidewall, a second sidewall configured to face the first sidewall, and a base formed between the first sidewall and the second sidewall;
   at least one lens disposed on the base;
   an image sensor disposed on one side in an optical axis direction of the at least one lens;
   a reflective member on which external light is incident, the reflective member including a reflective surface configured to change an optical path to direct the incident external light toward the at least one lens and the image sensor, wherein the reflective member is disposed on an opposite side in the optical axis direction of the at least one lens;
a linear actuator module including a first movable member slidably coupled to the first sidewall in the optical axis direction and a second movable member slidably coupled to the second sidewall in the optical axis direction; and
a holder having the reflective member disposed therein, the holder including a support part supported on the base so as to be rotated to correspond to a rotational direction having a first axis of rotation perpendicular to an optical axis of the lens as a center of rotation, or a rotational direction having a second axis of rotation perpendicular to the optical axis and the first axis of rotation as a center of rotation,
wherein each of the first movable member and the second movable member are connected to one side and an opposite side of the holder facing the first sidewall and the second sidewall with respect to the support part,
wherein the first movable member and the second movable member rotate the holder based on a sliding motion in the optical axis direction, and
wherein the holder is configured to rotate about the first axis of rotation based on sliding of the first movable member and the second movable member in the same direction, and rotate about the second axis of rotation based on sliding of the first movable member and the second movable member in opposite directions.

2. The camera assembly of claim 1, further comprising:
a guide part configured to guide sliding of the first movable member and the second movable member,
wherein the guide part includes a first guide groove formed on one surface of the first movable member, a second guide groove formed on one surface of the second movable member, a first corresponding guide groove formed on the first sidewall and configured to correspond to the first guide groove, and a second corresponding guide groove formed on the second sidewall and configured to correspond to the second guide groove, and
wherein the guide part further includes rolling members disposed between the first guide groove and the first corresponding guide groove and between the second guide groove and the second corresponding guide groove.

3. The camera assembly of claim 1, wherein the linear actuator module further includes magnetic bodies formed on the first movable member and the second movable member and coils formed on the first sidewall and the second sidewall and configured to correspond to the magnetic bodies, and
wherein movement directions of the first movable member and the second movable member are controlled by directions of currents flowing through the coils.

4. The camera assembly of claim 3, wherein the linear actuator module further includes metal plates around which the coils are wound and Hall sensors disposed on surfaces of the metal plates to face the magnetic bodies, and
wherein the Hall sensors sense magnetic flux densities changed by movements of the first movable member and the second movable member.

5. The camera assembly of claim 1, wherein the reflective member is formed of a prism further including a first surface on which the external light is incident and a second surface through which the external light reflected by the reflective surface is output toward the at least one lens.

6. The camera assembly of claim 1, wherein an inclined surface is formed on the base, and
wherein the support part of the holder includes a support ball having a ball shape, the support ball being configured to support rotation of the holder relative to the inclined surface.

7. The camera assembly of claim 6, wherein a support recess configured to correspond to the support ball is formed on the inclined surface, and at least part of the support ball is inserted into the support recess, and
wherein the first axis of rotation and the second axis of rotation are formed inside the support ball.

8. The camera assembly of claim 6, comprising:
a first magnet disposed inside the support ball of the holder and a second magnet disposed under the inclined surface,
wherein the second magnet presses the first magnet such that the support ball remains in a predetermined state.

9. The camera assembly of claim 1, wherein the first movable member and the second movable member include a first protrusion having a ball shape and a second protrusion, respectively, the first protrusion being formed on an end portion of the first movable member configured to face in the optical axis direction, and the second protrusion being formed on an end portion of the second movable member configured to face in the optical axis direction,
wherein the holder includes a first connecting part having a first connecting recess into which at least part of the first protrusion is inserted and a second connecting part having a second connecting recess into which at least part of the second protrusion is inserted.

10. The camera assembly of claim 9, wherein the first movable member and the second movable member include third magnets disposed adjacent to the first protrusion and the second protrusion, respectively, and the holder includes fourth magnets configured to face the third magnets, and
wherein the third magnets attract the fourth magnets to rotate the holder when the first movable member and/or the second movable member moves away from the reflective member.

11. The camera assembly of claim 1, wherein the linear actuator module further includes a third movable member that is coupled to the base so as to slide in the optical axis direction and on which the at least one lens is disposed,
wherein the image sensor is disposed on the base, and
wherein a distance between the at least one lens and the image sensor is adjusted by sliding of the third movable member.

12. The camera assembly of claim 11, further comprising:
a lens housing having the at least one lens therein, wherein the lens housing includes the third movable member.

13. The camera assembly of claim 12, wherein the lens housing is disposed between the first movable member and the second movable member and includes a first side surface configured to face the first movable member and a second side surface configured to face the second movable member, and
wherein the first side surface has a first sliding groove into which at least part of the first movable member is inserted, and the second side surface has a second sliding groove into which at least part of the second movable member is inserted.

14. The camera assembly of claim 11, further comprising:
a guide part configured to guide a movement of the third movable member, wherein the guide part includes a third guide groove formed on the base, a third corresponding guide groove formed on the third movable member and configured to correspond to the third guide groove, and a rolling member disposed between the third guide groove and the third corresponding guide groove.

15. The camera assembly of claim 1, further comprising:

a cover coupled to the frame, wherein the cover includes an upper wall configured to face the base, the upper wall having an opening formed therein, and wherein the external light is incident on the reflective surface through the opening.

\* \* \* \* \*